(12) United States Patent
Yang

(10) Patent No.: US 8,827,277 B2
(45) Date of Patent: Sep. 9, 2014

(54) OIL-RESERVING PISTON RING

(76) Inventor: Zengli Yang, Beijing (CN)

( * ) Notice: Subject to any disclaimer, the term of this patent is extended or adjusted under 35 U.S.C. 154(b) by 0 days.

(21) Appl. No.: 13/817,974

(22) PCT Filed: Aug. 20, 2010

(86) PCT No.: PCT/CN2010/001269
§ 371 (c)(1),
(2), (4) Date: Feb. 20, 2013

(87) PCT Pub. No.: WO2012/022012
PCT Pub. Date: Feb. 23, 2012

(65) Prior Publication Data
US 2013/0147124 A1 Jun. 13, 2013

(51) Int. Cl.
*F16J 9/12* (2006.01)
(52) U.S. Cl.
USPC .......................... 277/461; 277/460; 277/459
(58) Field of Classification Search
USPC .................................. 277/434, 459, 460, 461
See application file for complete search history.

(56) References Cited

U.S. PATENT DOCUMENTS 1,426,694 A * 8/1922 Weidenfeller ................. 277/455
2,160,379 A * 5/1939 Carroll .......................... 277/461
2,580,124 A * 12/1951 Phillips ......................... 277/444
2,640,746 A * 6/1953 Phillips et al. ................ 277/444
7,044,473 B1 5/2006 Zhu et al.

FOREIGN PATENT DOCUMENTS

| CN | 94221414.5 | 5/1996 |
|----|------------|--------|
| CN | 2260173 | 8/1997 |
| CN | 200410040819.7 | 4/2006 |
| CN | 200940521 | 8/2007 |
| CN | 200710078397.6 | 9/2007 |

OTHER PUBLICATIONS

International Search Report for PCT/CN2010/001269; dated May 26, 2011 (English Translation).

* cited by examiner

*Primary Examiner* — Gilbert Lee
(74) *Attorney, Agent, or Firm* — Baker & Hostetler LLP

(57) ABSTRACT

An oil-reserving piston ring includes an upper wedge ring (100a,200a) and a lower wedge ring (100b,200b) jointed with each other. The upper wedge ring (100a,200a) and the lower wedge ring (100b,200b) are each arranged with an opening, the upper wedge ring (100a,200a) has a first working surface (101,201) contacting with the wall of a cylinder, the lower wedge ring (100b,200b) has a second working surface (102, 202) contacting with the wall of the cylinder, and at least one of the first working surface (101,201) and the second working surface (102,202) is arranged with at least one oil-reserving groove (105,106,205,206). Also provided is a piston (600) with only one piston ring slot which is used for arranging the oil-reserving piston ring. The oil-reserving piston ring has a good lubricating property and seal, and is high in reliability.

14 Claims, 4 Drawing Sheets

OIL-RESERVING PISTON RING

CROSS-REFERENCE TO RELATED APPLICATIONS

This application is a National Stage of International Patent Application No. PCT/CN2010/001269, filed Aug. 20, 2010, the content of which is incorporated herein by reference in its entirety.

TECHNICAL FIELD

The present invention relates to a piston ring for an internal combustion engine, particularly an oil-reserving piston ring.

BACKGROUND ART

Conventional piston rings are usually in one-piece structure with an opening and leakage inevitably occurs at the opening. And, the higher the working pressure is, the more leakage there will be. As the abrasion increases, the leakage gradually becomes worse. Thus, the conventional piston ring of one-piece structure with an opening has always been working under leakage, and due to the opening leakage, a lot of power is lost and the efficiency is decreased.

In order to solve the leakage problem of the conventional piston ring with an opening, multiple piston rings are usually adopted so as to produce a labyrinth seal effect and reduce leakage. The labyrinth seal can decrease leakage, but can not avoid leakage. Moreover, multiple ring grooves are needed for the multiple piston rings. The increase in the number of ring grooves will surely lead to the reduction in the structural strength of the piston.

Conventional piston usually has two to three piston rings and one oil ring. During the operation of the piston, the lubricating oil is sputtered to the wall of the cylinder by the movement of the crankshaft to lubricate the piston rings. However, with the increase in the number of piston rings, friction gradually increases. The increase of each piston ring further deteriorates the lubrication of the upper ring. The top ring withstands the largest stress, while the lubrication condition thereof is the worst, especially near the upper dead center, which is in the state of dry friction. Inadequate lubrication is the main cause for the leakage and abrasion at the working surface.

Directing at the leakage problem of the conventional piston ring of one-piece structure with an opening, many forms of two-piece assembled piston rings successively appears. For example, Chinese patents 200410040819.7, 94221414.5 and 200710078397.6 respectively disclose an assembled piston ring, and their technical solutions are to place two pieces of piston rings up and down in the original piston ring groove, with the openings of the two piston rings staggered (the openings not arranged in the same direction), so as to achieve the purpose of mutual sealing. The two-piece assembled piston ring is expected to achieve a complete seal by the assembly of the two pieces, but such expected effect actually is not achieved.

Typically, the gap between the upper plane/surface of the piston ring and the piston ring groove is called an upper side gap, and the gap between the lower plane/surface of the piston ring and the piston ring groove is called a lower side gap. The gap between the piston ring groove and the side opposite to the working surface (i.e. the surface in contact with the wall of the cylinder) of the piston ring is called a back gap. The conventional one-piece piston ring with an opening and the two-piece assembled piston ring leak mainly through three channels.

The first leakage channel: the opening of the conventional one-piece piston ring is directly connected to the high pressure area and the low pressure area, obviously forming a direct leakage channel. The leakage amount of the leakage channel depends on the size of the opening, and the amount of leakage is intensified with the increasing abrasion.

The second leakage channel: when the two-piece assembled piston ring works under pressure, the opening of the upper piston ring and the upper side gap of the upper piston ring is connected to the common back gap of the two-piece piston ring. The common back gap is further connected to the opening of the lower piston ring. The opening of the lower piston ring is directly connected to the low pressure area. Hence, an indirect leakage channel is formed; the leakage amount of this channel depends on the size of the opening and is intensified with the increasing abrasion.

The third leakage channel: leakage occurs at the working surface of the piston ring. The working surface remains sealed by the lubricating oil. For multiple rings, the top ring works under the worst lubrication condition, and thus is worst sealed. When the working pressure exceeds the sealability of the working surface, leakage begins. The leakage amount of this channel depends on the thickness and the lubrication of the working surface, and is intensified with the increasing pressure.

Thus, it can be seen from above that, a complete seal cannot merely rely on the assembly of two pieces of piston rings. The two-piece assembled piston ring only solves the leakage problem of the first leakage channel, but cannot solve the leakage problem of the second and the third leakage channels.

In a two-piece assembled piston ring, the two pieces of piston rings are installed in the original piston ring groove. Hence, each piece of piston ring is only ½ of the thickness of the original piston ring, which will surely reduce the structural strength. A piston ring works at high temperature, high pressure and high speed, so the reduction in structural strength will directly affect its reliability. If the total thickness of the assembly of two pieces of piston rings increases, the lubrication of the upper piston ring will be further deteriorated, and the sealing effect cannot be ensured due to insufficient lubrication. Thus, sufficient lubrication is important to ensure the sealing effect.

Furthermore, the piston rings produce the phenomenon of oil pumping in the piston ring groove. When the piston ring reciprocates with the piston, the upper side gap and the lower side gap are alternately closed. Thus, the lubricating oil pumps into the back gap via the lower side gap, and further pumps into the upper side gap via the back gap. After completing the tasks of lubricating and cleaning, the lubricating oil runs into the combustion chamber and forms carbon deposits because the lubricating oil is not completely burned. In this process, the lubricating and cleaning function of the lubricating oil is beneficial, but the formation of carbon deposits is harmful.

In addition, a conventional piston has to provide multiple piston ring grooves in the limited size, so as to corporate with the multi-piston rings and further achieve the sealing effect. It not only makes the processing procedures of the conventional piston complicated, but also reduces the strength of the piston. Plus, a plurality of piston rings are needed to achieve the sealing effect, which leads to the conventional piston and piston rings complicated in processing, low in reliability, and increased in costs.

SUMMARY OF THE INVENTION

An object of the present invention is to provide an oil-reserving piston ring, which can be sufficiently lubricated in use, and further effectively prevent leakage in the working surface.

Another object of the present invention is to provide an oil-reserving piston ring, which is capable of forming an effective seal at the opening of the piston ring.

A further object of the present invention is to provide an oil-reserving piston ring, which can effectively prevent the lubricating oil from entering into the combustion chamber to form carbon deposits.

Still, another object of the present invention is to provide a piston, which only needs one oil-reserving piston ring to achieve a good sealing effect.

In order to achieve the above objects, according to a first aspect of the present invention, there is provided an oil-reserving piston ring, which comprises an upper wedge ring (i.e. a ring near the upper dead center) and a lower wedge ring engaged with each other. Each of the upper wedge ring and the lower wedge ring is provided with an opening. The upper wedge ring has a first working surface contacting with the wall of a cylinder, and the lower wedge ring has a second working surface contacting with the wall of a cylinder. At least one of the first working surface and the second working surface is provided with at least one oil-reserving groove.

The above technical solution is able to effectively solve the lubrication and leakage problem of the piston ring.

When the piston moves downward (i.e. the rich oil phase), part of the lubricating oil is stored in the oil-reserving groove. When the piston moves upward (i.e. the lean oil phase), the lubricating oil in the oil-reserving groove can be used for lubricating the working surface of the piston rings, thus enhancing the lubricating effect of the working surface, especially improving the lubrication state near the upper dead center. Therefore, the oil-reserving groove plays a crucial role in improving the lubrication and sealing of piston rings.

Further, according to another aspect of the present invention, on the basis of the first aspect, the working surface of the upper wedge ring is provided with an oil-reserving groove, and the upper surface of the upper wedge ring is provided with an oil-collecting groove which is connected to the oil-reserving groove.

The oil-collecting groove collects the lubricating oil to be pumped into the combustion chamber, for lubricating the working surface, which can reduce the consumption of the lubricating oil and prevent the lubricating oil from entering into the combustion chamber to form carbon deposits.

Preferably, the centerline of the oil-reserving groove is parallel to the upper surface of the upper wedge ring.

Preferably, an oil-reversing groove is arranged in the middle of the first working surface and in the middle of the second working surface, respectively. If the piston rings are thick enough, two or three oil-reserving grooves may be evenly arranged on the first working surface and the second working surface, respectively. By setting two or three oil reserving grooves, it is able to achieve better lubricating effect.

Preferably, the cross-section of the oil-reserving groove is approximately in a shape of a trapezoid, and the bottom edge of the trapezoid is in a straight line or a circular arc. The oil-reserving groove has a depth of preferably 0.5 mm to 2 mm, and a width of the opening thereof is preferably 0.4 mm to 1.8 mm, and the sidewalls thereof has an inclination of preferably from 2° to 10°.

The amount of the oil reserved can be adjusted by changing the width and depth of the oil-reserving groove. If the width of the oil-reserving groove is too large, lubricating oil consumption increases at the early period of each stroke. The lubricating oil may be exhausted at the later period. Finally, the lubrication is deteriorated. If the depth of the oil-reserving groove is increased and the width thereof is decreased, the lubricating oil will be uniformly consumed, and even sufficient lubrication can be achieved at the lean oil phase. However, the oil-reserving groove cannot be too deep, or, the dirt in the lubricating oil cannot be easily discharged, and further leads to deposition. Therefore, the cross section of the oil-reserving groove is designed in a shape of trapezoid, so as to facilitate the dirt discharge.

Furthermore, the width, depth and inclination of the oil-reserving groove in the oil-reserving piston ring of the present invention shall be designed in accordance with the piston stroke. For a long stroke, the depth of the oil-reserving groove shall be increased, so as to ensure sufficient lubrication near the upper dead center.

Preferably, 4 to 16 connecting holes connecting with the oil-reserving groove are provided at the bottom of the oil-collecting groove. These connecting holes are uniformly distributed within the oil-collecting groove, and the diameter thereof is preferably 0.5 mm to 1.5 mm.

Preferably, the cross section of the oil-collecting groove is U-shaped, and has a depth of preferably 0.5 mm to 2 mm and a width of preferably 0.8 mm to 3 mm.

The upper surface of the upper wedge ring of the present invention has an oil-collecting groove, which functions to collect the lubricating oil having completed the tasks of lubricating and cleaning and aims to reduce lubricating oil consumption and prevent the oil from pumping into the combustion chamber and forming carbon deposits. The bottom of the oil-collecting groove has connecting holes for connecting to the oil-reserving groove. The lubricating oil collected by the oil-collecting groove is supplied to the oil-reserving groove by the connecting holes, and is used for the lubrication of the working surface, thereby further improving the lubricating effect of the working surface of the piston ring.

Preferably, after assembling, the upper wedge ring and the lower wedge ring have a total thickness of 2 mm to 50 mm.

For the oil-reserving piston ring of the present invention, the total thickness of the assembled two pieces of piston rings is designed according to the working pressure. The total thickness of the assembled upper and lower wedge ring is larger than that of the conventional piston ring. The increase in thickness can improve the sealability of the working surface of the piston ring, and also enforce the structural strength.

Further, according to a further aspect of the present invention, on the basis of the first aspect, each opening of the upper wedge ring and the lower wedge ring includes an inside overlapping part and an outside overlapping part. The inside overlapping part comprises an inner projection, an outer recess and a first engaging portion for connecting the inner projection with the outer recess. The outside overlapping part comprises an outer projection, an inner recess and a second engaging portion for connecting the outer projection with the inner recess. The first engaging portion and the second engaging portion are engaged with each other. A first gap is arranged between the inner projection of the inside overlapping part and the inner recess of the outside overlapping part, and a second gap is arranged between the outer recess of the inside overlapping part and the outer projection of the outside overlapping part. Each of the first gap and the second gap is preferably 0.5 mm to 3 mm at the state of expansion. In addition, as shown in the top view, the inner projection and outer recess of the inside overlapping part and the outer projection and inner recess of the outside overlapping part are preferably in a shape of a circular arc.

A gap for expansion and contraction is arranged between the inner projection of the inside overlapping part and the inner recess of the outside overlapping part, and between the outer projection of the outside overlapping part and the outer recess of the inside overlapping part, so as to achieve sealing even when the temperature changes.

The inner projection and the outer recess of the inside overlapping part and the outer projection and the inner recess of the outside overlapping part are preferably in the shape of a circular arc, because the circular arc can prevent stress concentration and facilitate processing.

Preferably, as shown in the top view, the first engaging portion and the second engaging portion are circular arcs concentric with the piston ring, and each has an arc length of preferably from 5 mm to 50 mm.

The engaging surface between the inside overlapping part and the outside overlapping part is a closely fitted sealing surface, and is concentric with the piston ring. When being heated or worn, the piston ring can freely expand and shrink along the engaging surface (in concentric circle), and always maintain a state of being closely sealed, in order to effectively solve the leakage problems of the opening of the piston ring. Mere arcuate overlap or stepped overlap cannot ensure a long-term state of being closely fitted and sealed.

Preferably, the wedge surface of the upper wedge ring is engaged with the wedge surface of the lower wedge ring. The inclination between the wedge surface of the upper wedge ring and the upper surface of the upper wedge ring, and the inclination between the wedge surface of the lower wedge ring and the lower surface of the lower wedge ring, are both from 0.02° to 0.5°.

The inclination of the wedge surface of the two-piece wedge ring of the present invention can not be too large. At the high-speed movement of the piston, the action of two wedge surfaces can generate a very strong trend of relative sliding. The sliding pressure is directly proportional to the inclination of the wedge surface and the speed of the piston. The larger the inclination and the higher the speed, the larger the sliding pressure will be. If the inclination of the wedge surface is too large (e.g. over 0.5°), serious abrasion will be caused to the wall of the cylinder corresponding to the thick end. Therefore, it is better to have a smaller inclination of the wedge surfaces, and the minimum inclination is 0.02°.

In the present invention, the inclination of the wedge surface is closely related to the rotation speed of the internal combustion engine. The high-speed internal combustion engine is applicable to the piston ring having small inclination of wedge surfaces, while the low-speed internal combustion engine is applicable to the piston ring having larger inclination of wedge surfaces. Hence, the inclination α of the wedge surface should be designed according to the rotation speed.

Preferably, as shown in the top view of the piston ring, the angle between line linking the center of the opening of the upper wedge ring and the center of the piston ring and the line linking the thickest end and the thinnest end of the upper wedge ring is 10° to 30°, and the angle between the line linking the center of the opening of the lower wedge ring and the center of the piston ring and the line linking the thickest end and the thinnest end of the lower wedge ring is also 10° to 30°.

The engaging surface of the present invention remains in a state of being closely fitted and sealed by the tension of the inside overlapping part against the outside overlapping part.

Theoretically, the working surface of the piston ring should be worn simultaneously. If the abrasion at the outside overlapping part is greater than that at the inside overlapping part, gaps will occur on the engaging surface, and thus cannot ensure a close engagement. In order to make the inside overlapping part and the outside overlapping part maintain a state of being closely fitted and sealed, it is desirable to have the abrasion at the inside overlapping part slightly greater than that of at the outside overlapping part.

The abrasion at the thin end of the wedge ring is greater than that at the thick end of the wedge ring. Based on "the principle of greater abrasion at the thinner portion", in the present invention, the center of the opening of the wedge ring is staggered away from the plane in which the thickest and the thinnest end of the wedge surface are located (i.e. the symmetric center of the wedge ring) at a certain angle. It is desirable to arrange the portion having greater abrasion (the portion of the wedge ring adjacent to the outer recess of the inside overlapping part) at the symmetric center of the wedge ring, so that the abrasion at the inside overlapping part is greater than that at the outside overlapping part. When the thinnest end of the inside overlapping part at the symmetric center is worn, the first engaging portion of the inside overlapping part pushes against the outside overlapping part to wear synchronizingly. Thus, a state of close fitting and sealing can be maintained all the time. In the present invention, the center of the opening of the wedge ring and the symmetric center thereof are staggered at a certain angle, which is an important measure to ensure a long-term close fitting and sealing.

Furthermore, according to the inclination of the wedge surface, the present invention is designed with the center of the opening and the symmetric center of the wedge ring staggered at a certain angle. If the inclination of the wedge surface is large, the stagger angle between the center of the opening and the symmetric center of the wedge ring is small.

In addition, according to another aspect of the present invention, there is provided a piston. The piston thereon is arranged with only one piston ring groove, which is used to arrange the oil-reserving piston ring as described above.

With the oil-reserving piston ring of the present invention, the piston can be processed with only one piston ring groove. A good sealing performance can be achieved by using only one oil-reserving piston ring.

The oil-reserving piston ring of the present invention can be applied to the piston-type internal combustion engine and a compressor. The piston and piston ring of the present invention can replace the conventional pistons and the multiple piston rings each having one-piece structure, and have the advantages of good lubricating property, strong sealability and high reliability. For the compressor having ultra-high working pressure, two oil-reserving piston rings may also be used.

It can be seen that, the present invention provides an oil-reserving piston ring with the total thickness of the assembly of the two piston rings increased, so that the structural strength is enhanced, and the working surface of each wedge ring thereon is arranged with one to three oil-reserving grooves. And, the upper wedge ring is provided with an oil-collecting groove and connecting holes, so as to greatly improve the lubricating property, sealability and reliability of the piston ring. Thus, the present invention only needs one oil-reserving piston ring to replace the conventional multiple piston rings each having one-piece structure.

The oil-reserving piston ring of the present invention forms a state of sealing with opposite openings by the complementation of the two wedge surfaces, closes the first leakage channel by the assembly of two pieces, closes the second leakage channel by using the tension of the inside overlapping part of the wedge ring to form a state of being tightly fitted and sealed, and closes the third leakage channel by increasing the total thickness of the assembly of the two piston rings to improve the sealability of the working surface, guarantees the effects of lubricating and sealing of the working surface by using an oil-reserving groove, and effectively prevents carbon deposit by using the oil-collecting groove to collect the lubricating oil to be pumped into the combustion chamber for lubricating the working surface. Therefore, the present application only needs one oil-reserving piston ring to achieve an excellent sealing effect, and can replace the conventional multiple piston rings each having one-piece structure.

Figure 1:
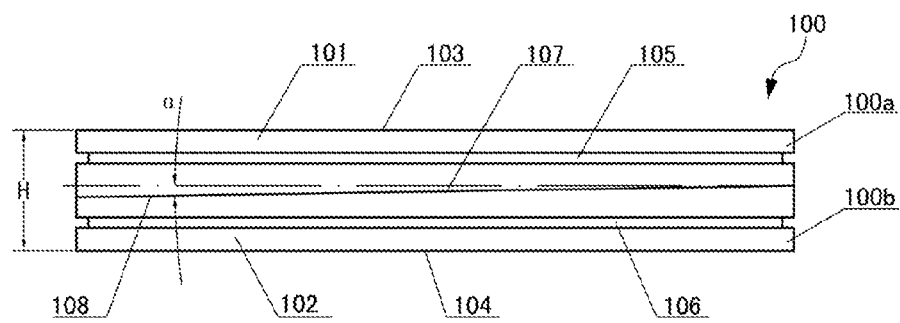
FIG. 1 is a front view of the oil-reserving piston ring according to the first embodiment of the present invention.

Wherein, the reference numerals used in the drawings are described as below:

100: oil-reserving piston ring; 100a: the upper wedge ring; 100b: the lower wedge ring; 101: the first working surface; 102: the second working surface; 103: the upper surface; 104: the lower surface; 105: oil-reserving groove; 106: oil-reserving groove; 107: the wedge surface of the upper wedge ring; 108: the wedge surface of the lower wedge ring; 110: the inside overlapping part; 110a: inner projection; 110b: the first engaging portion; 110c: outer recess; 111: the first gap; 120: the outside overlapping part; 120a: inner recess; 120b: the second engaging portion; 120c: outer projection; 112: the second gap; 200: oil-reserving piston rings; 200a: the upper wedge ring; 200b: the lower wedge ring; 201: the first working surface; 202: the second working surface; 203: the upper surface; 204: the lower surface; 205: oil-reserving groove; 206: oil-reserving groove; 207: the wedge surface of the upper wedge ring; 208: the wedge surface of the lower wedge ring; 213: the lower side gap; 214: back gap; 215: the upper side gap; 216: oil-collecting groove; 217: the connecting hole; 500: oil ring; 600: piston; H: the total thickness of the assembly of the upper wedge ring and the lower wedge ring; D: the width of the piston ring; α: the inclination of the wedge surface; β0: the angle; β1: the angle; O: the center of the piston ring; P: the thickest end of the upper wedge ring 100a; Q: the thinnest end of the upper wedge ring 100a; S: the center of the opening of the upper wedge ring 100a; N: the center of the opening of the lower wedge ring 100b.

DETAILED DESCRIPTION OF THE EMBODIMENTS

The present invention will be described below with the embodiments in combination with the drawings.

Figure 2:
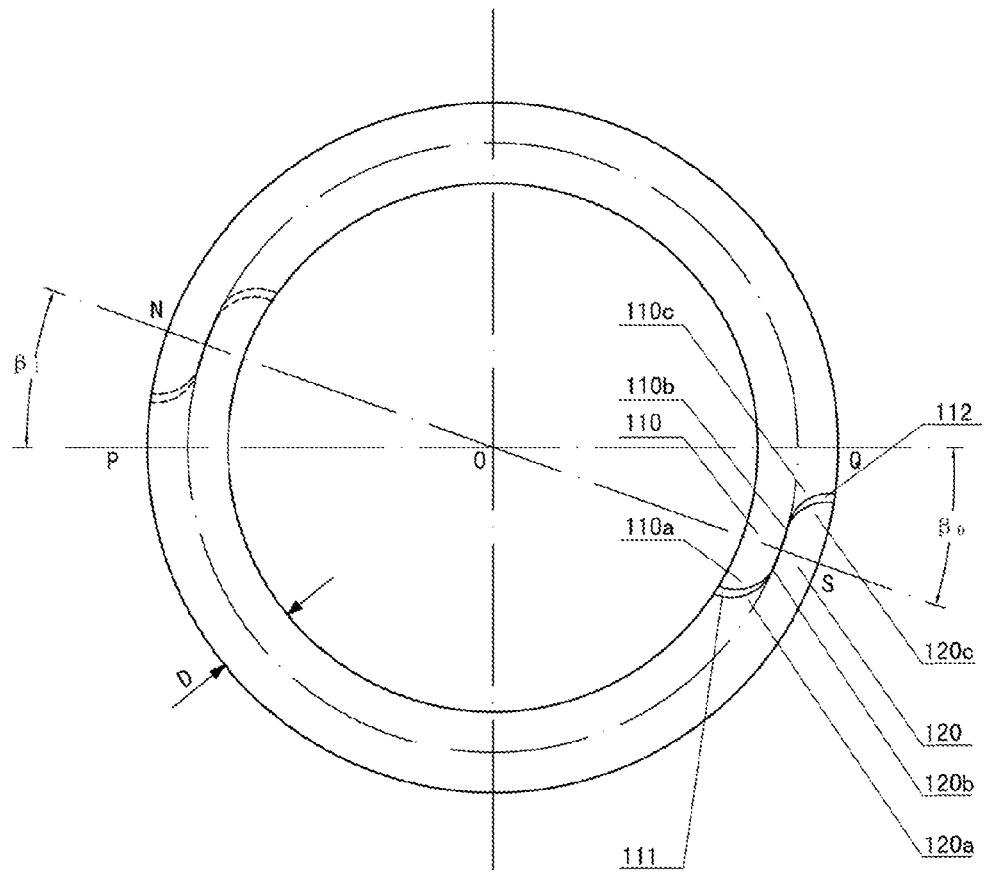
FIG. 2 is a top view of the oil-reserving piston ring according to the first embodiment of the present invention.
Figure 3:
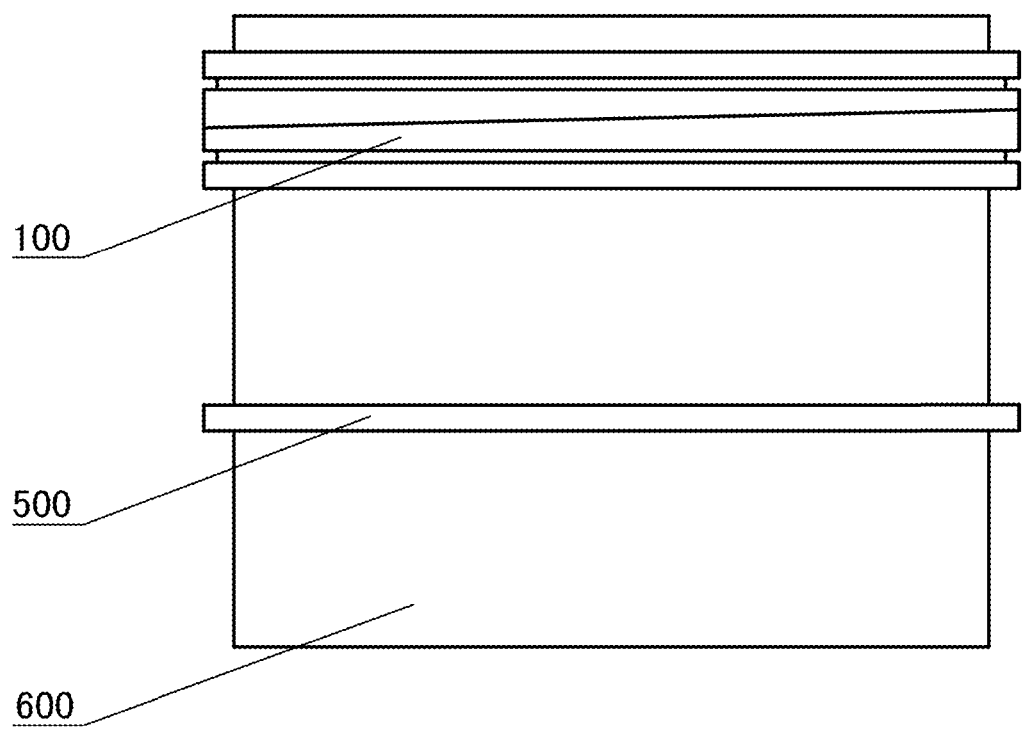
FIG. 3 is a schematic drawing of the oil-reserving piston ring which is assembled onto the piston ring according to the first embodiment of the present invention.

FIGS. 1 to 3 is a schematic drawing according to the first embodiment of the present invention. FIG. 1 is the front view of an oil-reserving piston ring according to the first embodiment of the present invention. According to the present invention, the oil-reserving piston ring includes, as shown in FIG. 1, an upper wedge ring 100a and a lower wedge ring 100b engaged with each other. The upper wedge ring 100a is provided with an opening and has a first working surface 101 contacting with the wall of a cylinder. The lower wedge ring 100b is provided with an opening and has a second working surface 102 contacting with the wall of a cylinder. The first working surface 101 is provided with one oil-reserving groove 105, and the second working surface 102 is provided with one oil-reserving groove 106. The upper wedge ring 100a has an upper surface 103 which contacts with the piston ring groove when being used. The lower wedge ring 100b has a lower surface 104 which contacts with the piston ring groove when being used. The upper wedge ring 100a further has a wedge surface 107 engaging with the wedge surface of the lower wedge ring 100b, so that the upper wedge ring 100a and the lower wedge ring 100b are engaged together.

In the embodiment shown in FIG. 1, the centerline of the oil-reserving groove 105 is parallel with the upper plane/surface 103 of the upper wedge ring 100a, that is, the oil-reserving groove 105 is parallel with upper surface 103 of the upper wedge ring 100a. The centerline of the oil-reserving groove 106 is parallel with the lower plane/surface 104 of the lower wedge ring 100b, that is, the oil-reserving groove 106 is parallel with the lower surface 104 of the lower wedge ring 100b. Also, the upper surface 103 of the upper wedge ring 100a is parallel with the lower surface 104 of the lower wedge ring 100b.

FIG. 2 is a top view of the oil-reserving piston ring according to the first embodiment of the present invention. As shown in FIG. 2, the opening of the upper wedge ring 100a and the opening of the lower wedge ring 100b are staggered away from each other, that is, said two openings are not arranged in the same direction.

The opening of the upper wedge ring 100a includes an inside overlapping part 110 and an outside overlapping part 120. The inside overlapping part 110 includes an inner projection 110a, an outer recess 110c and a first engaging portion 110b connecting the inner projection 110a with the outer recess 110c. The outside overlapping part 120 includes an inner recess 120a, an outer projection 120c and a second engaging portion 120b connecting the inner recess 120a with the outer projection 120c. The first engaging portion 110b and the second engaging portion 120b are engaged to form a seal.

Further, as shown in FIG. 2, the inner protrusion 110a and the outer recess 110c of the inside overlapping part 110 are preferably in a shape of circular arc, and the outer projection 120c and the inner recess 120a of the outside overlapping part 120 are preferably in a shape of circular arc.

Further, as shown in FIG. 2, the first engaging portion 110b and the second engaging portion 120b are circular arcs concentric with the center O of the piston ring. The diameter of a variety of piston rings may be very large or very small. The smallest diameter may be 40 mm and the largest diameter may be 600 mm, so the arc length of the first engaging portion 110b and the second engaging portion 120b are preferably set within a range of 5 mm to 50 mm.

There is a first gap 111 between the inner projection 110a of the inside overlapping part 110 and the inner recess 120a of the outside overlapping part 120. There is a second gap 112 between the outer recess 110c of the inside overlapping part 110 and the outer projection 120c of the outside overlapping part 120. The first gap 111 and the second gap 112 are used for expansion and contraction. The gap is in a range of 0.5 mm to 3 mm at the highest temperature (in the state expansion). The first engaging portion 110b and the second engaging portion 120b are designed as circular arcs concentric with the center O of the piston rings, and there is provided with a gap between the inner projection 110a and the inner recess 120a and between the outer recess 110c and the outer projection 120c, respectively, so when being heated to expand or being worn, the piston ring can expand and contract freely along the engaging surface and always maintain a state of being closely fitted and sealed.

In addition, the stroke of a variety of pistons may be very long or very short. The longest stroke may be up to 3000 mm and the shortest one may be 50 mm. According to the piston ring in the first embodiment of the present invention, the total thickness H of the assembly of the upper wedge ring 100a and the lower wedge ring 100b is in the range of 2 mm to 50 mm. The total thickness H of the assembly of the upper and lower wedge rings is designed in accordance with the working pressure, as 1.5 to 4 times of the conventional one-piece piston ring with an opening.

According to the oil-reserving piston ring of the present embodiment, the increase in the total thickness H of the assembly of the upper and lower wedge rings cause the structural strength thereof enforced. Thus, if the assembled total thickness comes up to more than 2 times of the original conventional piston ring, the width D of the piston ring shall be appropriately reduced due to the excessive elastic force.

In the present embodiment, the cross-sections of the oil-reserving groove 105, 106 are designed as approximately trapezoid-shaped. The oil-reserving groove 105, 106 is set to have a depth in the range from 0.5 mm to 2 mm, a width of the opening thereof in the range from 0.4 mm to 1.8 mm, and the inclination of the sidewall thereof is in the range from 2° to 10°. The bottom edge of the trapezoid may be a straight line, or may also be an arc.

In the present embodiment, the inclination α of the wedge surface 107 of the upper wedge ring 100a relative to the upper surface 103 of the upper wedge ring 100a is set in the range of 0.02° to 0.5°. The inclination α of the wedge surface 108 of the lower wedge ring 100b relative to the lower surface 104 of the lower wedge ring 100b is also set in the range of 0.02° to 0.5°.

In the present embodiment, as shown in FIG. 2, the angle $\beta_0$ between the line linking the center S of the opening of the upper wedge ring 100a and the center O of the piston ring 100 and the line linking the thickest end P and the thinnest end Q of the upper wedge ring 100a is set in the range of 10° to 30°. Also, the angle $\beta_1$ between the line linking the center N of the opening of the lower wedge ring 100b and the center O of the piston ring and the line linking the thickest end Q and the thinnest end P of the lower wedge ring 100b is set in the range of 10° to 30°.

FIG. 3 is a schematic drawing of the oil-reserving piston ring which is assembled onto the piston according to the first embodiment of the present invention. As shown in FIG. 3, according to the first embodiment of the present invention, the piston ring 100 is arranged on the piston 600. The piston 600 is also provided with an oil ring 500, and the piston ring 100 is located over the oil ring 500. As can be seen from FIG. 3, according to the first embodiment of the present invention, a good sealing effect can be achieved by using only one piston ring.

Next, a second embodiment according to the present invention will be described with reference to FIGS. 4 to 6. The second embodiment of the present invention is an improvement to the first embodiment, so the features similar to the first embodiment are marked with similar reference numerals, and corresponding description is omitted.

As described in the background art, the piston ring pumps oil in the piston ring groove. Due to oil pumping, the lubricating oil runs into the combustion chamber and finally forms deposited carbon. In order to solve such problem, the second embodiment of the present invention is designed.

Figure 4:
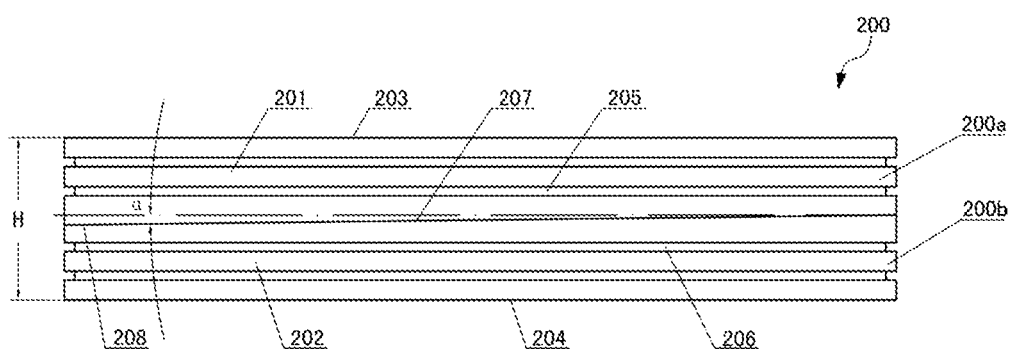
FIG. 4 is a front view of the oil-reserving piston ring according to the second embodiment of the present invention.

FIG. 4 is a front view of the oil-reserving piston ring according to the second embodiment of the present invention. As shown in FIG. 4, according to the second embodiment of the present invention, the oil-reserving piston ring 200 includes an upper wedge ring 200a and a lower wedge ring 200b engaged with each other. The upper wedge ring 200a is provided with an opening, and has a first working surface 201 contacting with the wall of a cylinder. The lower wedge ring 200b is provided with an opening, and has a second working surface 202 in contact with the wall of a cylinder. The first working surface 201 is provided with two oil-reserving grooves 205, and the second working surface 202 is provided with two oil-reserving grooves 206. The upper wedge ring 200a has an upper surface 203, which contacts with the piston ring groove in use. Plus, the lower wedge ring 200b has a lower surface 204, which contacts with the piston ring groove in use. The upper wedge ring 200a also has a wedge surface 207, which is contacted with the wedge surface 208 of the lower wedge ring 200b, so that the upper wedge ring 200a and the lower wedge ring 200b are engaged together.

Figure 5:
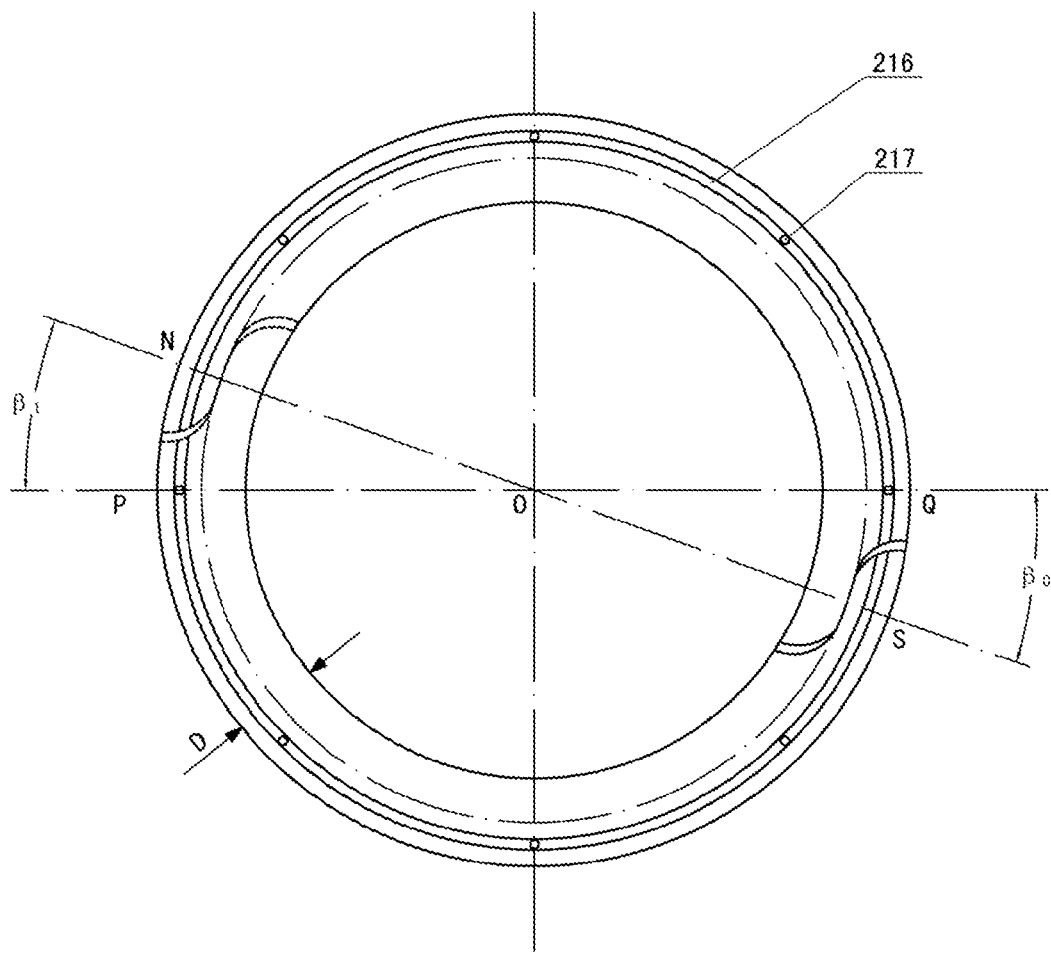
FIG. 5 is a top view of the oil-reserving piston ring according to the second embodiment of the present invention.

FIG. 5 is a top view of the oil-reserving piston ring according to the second embodiment of the present invention. As shown in FIG. 5, the oil-collecting groove 216 arranged on the upper surface 203 of the upper wedge ring 200a is round-shaped, and the bottom of the oil-collecting groove 216 is evenly distributed with 8 connecting holes 217.

Figure 6:
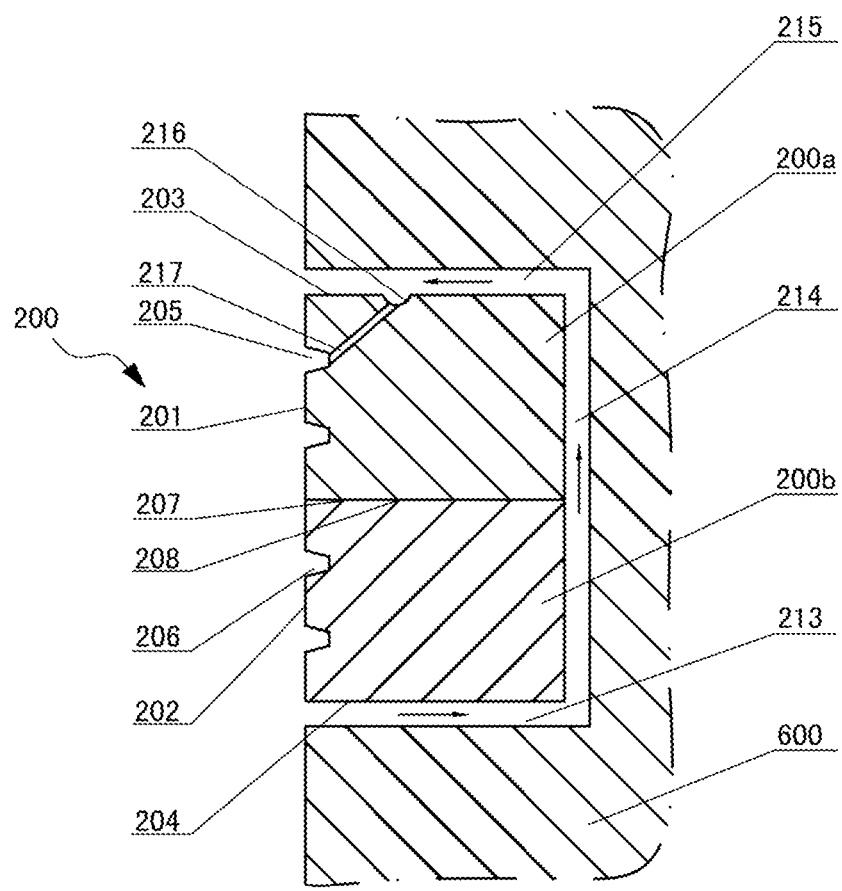
FIG. 6 is a partial sectional view of the oil-reserving piston ring which is assembled onto the piston ring according to the second embodiment of the present invention.

FIG. 6 is referred to as below. FIG. 6 is a partial cross-sectional view of the oil-reserving piston ring which is assembled onto the piston according to the second embodiment of the present invention. As shown in FIG. 6, the upper wedge ring 200a is provided with two oil-reserving grooves 205, and the upper surface 203 of the upper wedge ring 200a is provided with an oil-collecting groove 216. The connecting holes 217 connects the oil-collecting groove 216 with the oil-reserving groove 205 arranged at the upper side of the upper wedge ring 200a. In addition, as shown in FIG. 6, as the piston reciprocates, the upper side gap 215 and the lower side gap 213 are alternately closed. Hence, the lubricating oil pumps from the lower side gap 213 into the back gap 214 along the direction of the arrow, and then from the back gap 214 into the upper side gap 215. When the upper side gap 215 is closed, the lubricating oil is collected into the oil-collecting groove 216, and is introduced into the upside oil-reserving groove 205 through the connecting holes 217. The oil-collecting groove 216 collects the lubricating oil, which has completed the tasks of lubricating and cleaning, for lubricating the working surface of the piston ring and preventing the lubricating oil from running into the combustion chamber and forming deposited carbon.

According to the second embodiment of the present invention, there are 8 connecting holes, the number of which may also be 4 to 16. These connecting holes 217 are uniformly distributed in the oil-collecting groove 216, and introduce the lubricating oil from the oil-collecting groove 216 to the oil-reserving groove 205. The diameter of these connecting holes 217 is preferably 0.5 mm to 1.5 mm.

As shown in FIG. 6, the cross-section of the oil-collecting groove 216 is approximately U-shaped, and the depth of the oil-reserving groove 216 may be from 0.5 mm to 2 mm, and the width thereof may be 0.8 mm to 3 mm.

The abovementioned is a schematic description of the present invention. The following are the experimental examples of the present invention compared with the conventional techniques, through which the beneficial effects of the present invention can be clearly seen.

Table 1 shows a gasoline engine having a pressure of 1.5 MPa when the piston is at the upper dead center and the highest rotation speed of 8000 r/min.

TABLE 1

|  | The present invention | Conventional designs |
|---|---|---|
| Type of the piston ring | An oil-reserving piston ring comprising an upper wedge ring and a lower wedge ring. | One-piece piston ring with an opening |
| Number of the piston rings | 1 | 2 |
| Number of oil rings | 1 | 1 |
| Diameter of the piston ring | 80 mm | 80 mm |
| Thickness of the piston ring | 4.2 mm | 2.8 mm |

TABLE 1-continued

|  | The present invention | Conventional designs |
|---|---|---|
| Width of the piston ring | 4.8 mm | 5 mm |
| Number, location, shape and size of the oil-reserving groove | One; located at the upper wedge ring; trapezoidal; depth: 0.6 mm; width of the opening: 0.5 mm; the inclination of the sidewall: 4°. | No |
| Other parameters | $\alpha = 0.02°$ $\beta_0 = \beta_1 = 30°$ the arc lengths of the first and the second engaging portions are both 5 mm; after expansion, both the first gap and the second gap are 0.5 mm. |  |
| Effects | The lifespan of the piston ring can be prolonged by more than one time, and the cylinder pressure meter indicates that the pressure is increased by 0.1 Mpa. |  |

Table 2 shows the diesel engine having a pressure of 3 MPa when the piston is at the upper dead center and the highest rotation speed of 3600 r/min.

TABLE 2

|  | The present invention | Conventional designs |
|---|---|---|
| Type of the piston ring | Oil-reserving piston ring comprising an upper wedge ring and a lower wedge ring. | One-piece piston ring with an opening |
| Number of piston rings | 1 | 3 |
| Number of oil rings | 1 | 1 |
| Diameter of the piston ring | 120 mm | 120 mm |
| Thickness of the piston ring | 10 mm | 3.6 mm |
| Width of the piston ring | 6.0 mm | 6.2 mm |
| Number, location, shape and size of the oil-reserving groove | two; each on the upper wedge ring and the lower wedge ring; trapezoidal; depth: 1 mm; width of the opening: 0.8 mm; inclination of the sidewalls: 8° | No |
| Other parameters | $\alpha = 0.1°$ $\beta_0 = \beta_1 = 20°$ the arc lengths of the first and the second engaging portion are respectively 10 mm; after expansion, the first gap and the second gap are respectively 1 mm. |  |
| Effects | The lifespan of the piston ring can be prolonged by more than one time; and the cylinder pressure meter indicates that the pressure is increased by 0.12 Mpa. |  |

Table 3 shows a diesel engine having a pressure of 3.5 MPa when the piston is at the upper dead center and the highest rotation speed of 2500 r/min.

TABLE 3

|  | The present invention | Conventional design |
|---|---|---|
| Types of the piston ring | oil-reserving piston rings comprising the upper and lower wedge rings | One-piece piston ring with an opening |
| Number of piston rings | 1 | 3 |
| Number of oil rings | 1 | 1 |
| Diameter of piston ring | 300 mm | 300 mm |
| Thickness of piston ring | 16 mm | 4 mm |
| Width of piston ring | 6.2 mm | 7 mm |
| Number, location, shape and size of the | Four; two for each of the upper wedge ring and the lower wedge ring; | No |

TABLE 3-continued

|  | The present invention | Conventional design |
|---|---|---|
| oil-reserving grooves | trapezoidal; depth: 1.5 mm; width of the opening: 1.2 mm; inclination of the sidewalls: 10°. |  |
| Number, shape and size of the oil-collecting groove | one; the top view is round-shaped and the cross section is U-shaped; the depth is 1.5 mm and the width is 2 mm | No |
| Number, size and distribution of the connecting holes | Twelve; diameter: 1.4 mm; evenly distributed in the oil-collecting groove | No |
| Other parameters | $\alpha = 0.5°$<br>$\beta_0 = \beta_1 = 10°$<br>the arc lengths of the first and the second engaging portions are both 30 mm; after expansion, the first and the second gaps are both 1.5 mm |  |
| Effects | The lifespan of the piston ring can be prolonged by more than one time, and the cylinder pressure meter indicates the pressure is increased by 0.2 Mpa. |  |

Table 4 shows the gasoline engine having a pressure of 2.4 Mpa when the piston ring is at the upper dead center and the highest rotation speed of 4000 r/min.

TABLE 4

|  | The present invention | Conventional design |
|---|---|---|
| Type of piston ring | Oil-reserving piston ring comprising the upper and lower wedge rings. | One-piece piston ring with an opening |
| Number of piston rings | 1 | 3 |
| Number of oil rings | 1 | 1 |
| Diameter of piston ring | 86 mm | 86 mm |
| Thickness of piston ring | 8.4 mm | 2.8 mm |
| Width of piston ring | 4.2 mm | 5 mm |
| Number, location, shape and size of the oil-reserving grooves | three; two at the upper wedge ring and one at the lower wedge ring; trapezoidal; depth: 0.8 mm; width of opening: 1.2 mm; inclination of sidewall: 5° | No |
| Number, shape and size of the oil-collecting grooves | One; the top view is round-shaped; the cross section is U-shaped; the depth is 0.8 mm and the width is 1.2 mm | No |
| Number, size and distribution of the connecting holes | Ten; diameter: 1.2 mm; evenly distributed in the oil-collecting groove. | No |
| Other parameters | $\alpha = 0.3°$<br>$\beta_0 = \beta_1 = 25°$<br>the arc lengths of the first and the second engaging portions are both 15 mm; after expansion, the first and the second gaps are both 0.5 mm |  |
| Effects | The lifespan of the piston ring can be prolonged by more than one time, and the cylinder pressure meter indicates the pressure is increased by 0.15 Mpa. |  |

The above introduced is just the schematic embodiments of the present invention. It should be understood that various changes may be made to the present invention without departing from the concept of the invention.

For example, the present invention requires that the wedge surfaces of the two wedge rings have consistent inclination α, but it does not require that the openings of the two wedge rings must be kept at 180°, so relative deviation is acceptable. Namely, the openings of the two wedge rings are allowed to be greater or less than 180°, for the purpose of increasing the freedom in processing and reducing rejection rate.

For another example, the present invention must guarantee the total thickness H of the assembly of the two wedge rings, but does not require complete consistency in the thickness of the two rings, so it is acceptable to make one ring slightly thinner while the other ring slightly thicker. Deviation in the thickness of each ring is allowable, for the purpose of increasing the freedom in processing and reducing rejection rate.

The invention claimed is:

1. An oil-reserving piston ring, comprising an upper wedge ring (100a, 200a) and a lower wedge ring (100b, 200b) engaged with each other, the upper wedge ring (100a, 200a) and the lower wedge ring (100b, 200b) being each provided with an opening; the upper wedge ring (100a, 200a) having a first working surface (101, 201) contacting with the wall of a cylinder and the lower wedge ring (100b, 200b) having a second working surface (102, 202) contacting with the wall of the cylinder; characterized in that: at least one of the first working surface (101, 201) and the second working surface (102, 202) is arranged with at least one oil-reserving groove (105, 106, 205, 206);

wherein the openings of the upper wedge ring (100a, 200a) and the lower wedge ring (100b, 200b) each include an inside overlapping part (110) and an outside overlapping part (120); the inside overlapping part (110) includes an inner projection (110a), an outer recess (110c) and a first engaging portion (110b) connecting the inner projection (110a) and the outer recess (110c); the outside overlapping part (120) includes an outer projection (120c), an inner recess (120a) and a second engaging portion (120b) connecting the outer projection (120c) with the inner recess(120a); the first engaging portion (110b) and the second engaging portion (120b) are engaged; there is a first gap (111) between the inner projection (110a) of the inside overlapping part (110) and the inner recess (120a) of the outside overlapping part (120); there is a second gap between the outer recess (110c) of the inside overlapping part (110) and the outer projection (120c) of the outside overlapping part (120).

2. The oil-reserving piston ring according to claim 1, characterized in that: the upper wedge ring (200a) is arranged with an oil-reserving groove (205), and the upper surface (203) of the upper wedge ring (200a) is arranged with an oil-collecting groove (216) connecting with the oil-reserving groove (205).

3. The oil-reserving piston ring according to claim 2, characterized in that: 4 to 16 connecting holes (217) connecting with the oil-reserving groove (205) are provided at the bottom of the oil-collecting groove (216); these connecting holes (217) are evenly distributed in the oil-collecting groove (216), and the diameter of the connecting holes (217) is in a range of 0.5 mm to 1.5 mm.

4. The oil-reserving piston ring according to claim 2, characterized in that: the oil-collecting groove (216) has a U-shaped cross-section, a depth of 0.5 mm to 2 mm, and a width of 0.8 mm to 3 mm.

5. The oil-reserving piston ring according to claim 1, characterized in that: the centerline of the oil-reserving groove (105, 106, 205, 206) and the upper surface (103, 203) of the upper wedge ring (100a, 200a) are parallel.

6. The oil-reserving piston ring according to claim 1, characterized in that: the middle of the first working surface (101, 201) and the middle of the second working surface (102, 202) are each arranged with one oil-reserving groove (105, 106, 205, 206), or the first working surface (101, 201) and the second working surface (102, 202) are each evenly distributed with two or three oil-reserving grooves (105, 106, 205, 206).

7. The oil-reserving piston ring according to claim 1, characterized in that: the cross section of the oil-reserving groove (105, 106, 205, 206) is substantially trapezoidal; the bottom edge of the trapezoid is straight line or circular arc; the depth of the oil-reserving groove is in a range of 0.5 mm to 2 mm and the width of the opening thereof is in a range of 0.4 mm to 1.8 mm; the sidewall of the oil-reserving groove has an inclination of 2° to 10°.

8. The oil-reserving piston ring according to claim 1, characterized in that: the total thickness (H) of the assembly of the upper wedge ring (100a, 200a) and the lower wedge ring (100b, 200b) is in a range of 2 mm to 50 mm.

9. The oil-reserving piston ring according to claim 1, characterized in that: as shown in the top view, the inner projection (110a) and the outer recess (110c) of the inside overlapping part (110) and the outer projection (120c) and the inner recess (120a) of the outside overlapping part (120) are all in the shape of circular arc.

10. The oil-reserving piston ring according to claim 1, characterized in that: as shown in the top view, the first engaging portion (110b) and the second engaging portion (120b) are arcs concentric with the piston ring.

11. The oil-reserving piston ring according to claim 10, characterized in that: the first engaging portion (110b) and the second engaging portion (120b) each have an arc length of from 5 mm to 50 mm, and each of the first gap (111) and the second gap (112) is in a range of 0.5 mm to 3 mm in the state of expansion.

12. The oil-reserving piston ring according to claim 1, characterized in that: the wedge surface (107, 207) of the upper wedge ring (100a, 200a) and the wedge surface (108, 208) of the lower wedge ring (100b, 200b) are engaged with each other; the inclination ($\alpha$) of the wedge surface (107, 207) of the upper wedge ring (100a, 200a) relative to the upper surface (103, 203) of the upper wedge ring (100a, 200a) and the inclination ($\alpha$) of the wedge surface (108, 208) of the lower wedge ring (100b, 200b) relative to the lower surface (104, 204) of the lower wedge ring (100b, 200b) are both in a range of 0.02° to 0.5°.

13. The oil-reserving piston ring according to claim 1, characterized in that: as shown in the top view of the piston ring, the angle ($\beta_0$) between the line linking the center of the opening of the upper wedge ring (100a, 200a) and the center of the piston ring and the line linking the thickest end and the thinnest end of the upper wedge ring (100a, 200a) is from 10° to 30°; the angle ($\beta_1$) between the line linking the center of the opening of the lower wedge ring (100b, 200b) and the center of the piston ring and the line linking the thickest end and the thinnest end of the lower wedge ring (100b, 200b) is in a range of 10° to 30°.

14. A piston, characterized in that: the piston is provided with only one piston ring groove for installing the oil-reserving piston ring according to claim 1.

* * * * *